Figure 1:
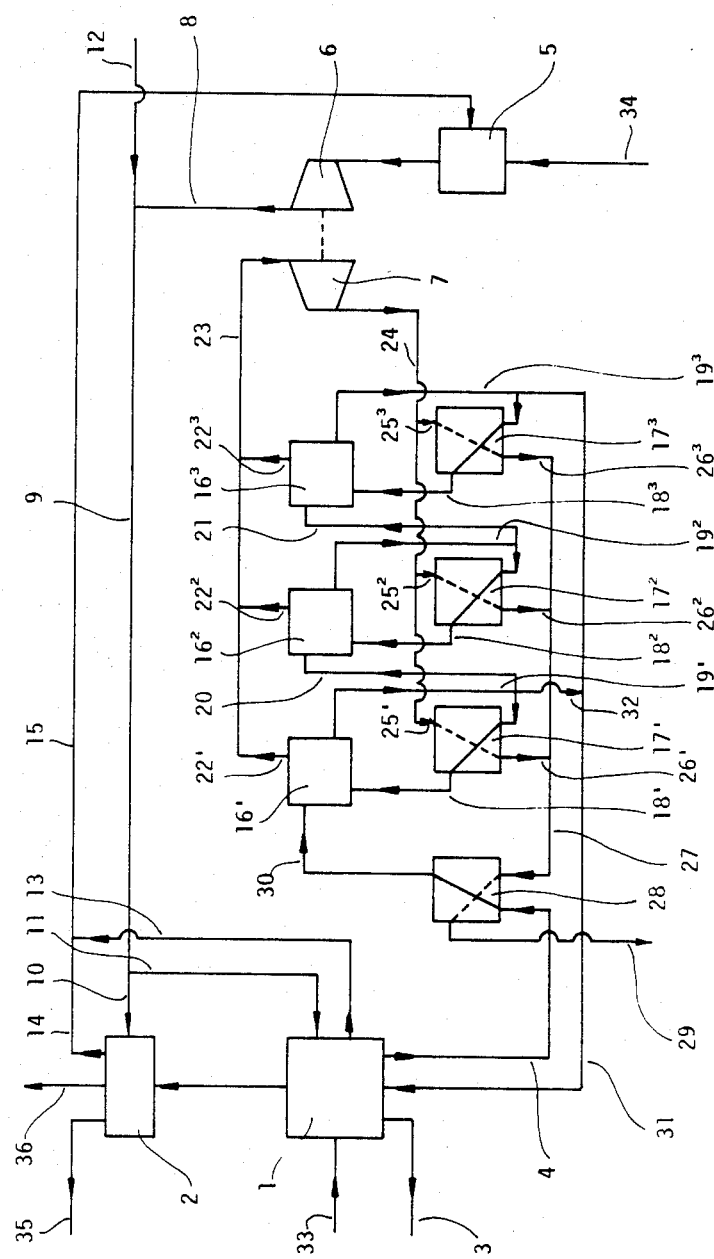

United States Patent [19]

Vernet

[11] Patent Number: 4,532,144

[45] Date of Patent: Jul. 30, 1985

[54] PROCESS FOR MANUFACTURE OF MEAT MEAL AND FAT FROM AN ANIMAL RAW MATERIAL

[75] Inventor: Borje Vernet, Huddinge, Sweden

[73] Assignee: Alfa-Laval AB, Tumba, Sweden

[21] Appl. No.: 503,145

[22] PCT Filed: Sep. 20, 1982

[86] PCT No.: PCT/SE82/00287

§ 371 Date: May 26, 1983

§ 102(e) Date: May 26, 1983

[87] PCT Pub. No.: WO83/01275

PCT Pub. Date: Apr. 14, 1983

[30] Foreign Application Priority Data

Oct. 12, 1981 [SE] Sweden ................................ 8106018

[51] Int. Cl.³ ............................................... A23K 1/10
[52] U.S. Cl. ..................................... 426/643; 426/472; 426/480
[58] Field of Search ............... 426/641, 643, 807, 472, 426/480

[56] References Cited

U.S. PATENT DOCUMENTS

| | | | |
|---|---|---|---|
| 3,959,518 | 5/1976 | Vincent | 426/643 |
| 4,122,208 | 10/1978 | Tronstad | 426/643 X |
| 4,212,889 | 7/1980 | Fuentevilla | 426/643 X |
| 4,344,976 | 8/1982 | Bladh | 426/643 X |
| 4,405,649 | 9/1983 | Jeffreys et al. | 426/643 X |
| 4,405,653 | 9/1983 | Gray | 426/643 |

*Primary Examiner*—R. B. Penland
*Attorney, Agent, or Firm*—Cyrus S. Hapgood

[57] ABSTRACT

In a process for continuous production of meat meal and fat from an animal raw material by indirect boiling (1) of the raw material and separation (1) of the boiled material partly into solid material, which is dried (2), and partly in stick water, which is partly evaporated (16) and is discharged from the plant or is dried, the novelty consists in the fact that a so called back pressure turbine (6) is operated, the back pressure steam (8) being utilized for boiling (1) and drying (2), while the turbine (6) is allowed to drive a mechanical compressor (7), which compresses steam (23), that is discharged from an expansion vessel (16) in which said stick water (4) is evaporated by stripping, the compressed steam (24) being utilized for heating of the stick water, circulating in a circuit, comprising said expansion vessel (16) and a heat exchanger (25).

7 Claims, 2 Drawing Figures

PROCESS FOR MANUFACTURE OF MEAT MEAL AND FAT FROM AN ANIMAL RAW MATERIAL

This invention relates to a process for continuous manufacture of meat meal and fat from an animal raw material a stream of the latter being completely or partly boiled in a boiler, which is heated indirectly with steam, the boiled material being separated, partly in a stream of solid material, which is completely or partly dried in a dryer, which is heated indirectly by steam, partly a fat stream and partly of proteinuous so called stick water, which is at least partly evaporated to a relatively concentrated state and is discharged from the system or is alternatively dried, preferably together with said solid material. Such processes are well known and are available in several variations. The raw material, for example fish, whole or disintegrated, is preheated in a preheater and is finally boiled in a boiler. The mass thus obtained is separated by a centrifugal separator or a press into said stream of solid material, which is dried, respectively a stream of proteinuous water, mixed with solid substance and fat, which stream is separated in a series of centrifugal separators, into a fat stream, which is discharged from the system, and said stick water stream, which is evaporated to a concentrate in an evaporator plant. This usually comprises several steps, coupled in series in order that a reasonably good heat economy is achieved.

In later years the rising energy costs have enforced processes comprising means for heat recovery. Thus there are devices for heat recovery from the dryer steps and the evaporator plant. They are complicated, however, and show some drawbacks. The separate process steps are namely dependent upon each other so that balance problems may occur. Such systems are characterized by great international feed-back and demand a long period of start up till equilibrium and stability is achieved. For this reason the start up and recovery after operational disturbances will demand a long period of time, so that the capacity is decreased. In many cases a supporting heating system is installed for security reasons, which system is often misused, so that the heat recovery devices are not utilized.

The objective of the present invention is to provide a process of the type mentioned introductorily, which is simple and reliable, which can be heat balanced easily and quickly and which shows a low energy consumption (kgs oil per ton raw material).

According to the invention such as invention is characterized in that there is generated in a steam generator a steam stream, which is brought to drive a steam turbine under expansion to a relatively high so called back pressure, at which pressure the steam stream is led to heat said boiler and said dryer, the condensate stream resulting from the steam stream preferably being recirculated to said steam generator, the steam tubine being brought to drive a mechanical compressor, like a centrifugal compressor, said stick water stream being brought to yield a first stream of expansion steam in at least a first expansion vessel by pressure reduction, which expansion steam is led to the mechanical compressor for compression, the flow of compressed steam being brought to yield heat in a first heat exchanger to a stream of concentrated stick water, circulating in a circuit, comprising the first expansion vessel and the first heat exchanger, a part of the concentrated stick water being discharged from said circuit and possibly being led to said dryer for drying. The conventional evaporator plant has been replaced by one or several circulation circuits, each of them comprising an expansion vessel and a heat exchanger, evaporator effect being fed by compressing of the liberated steam.

Two or a plurality of expansion vessels may be used, coupled in series, the amount of concentrated stick water, that is discharged from said circuit being fed to a second circulation circuit, comprising a second expansion vessel and a second heat exchanger, the stream in question being brought to yield a second stream of expansion steam, which is fed to the mechanical compressor for compression, the formed combined flow of compressed steam being brought to yield heat in a second heat exchanger to the circulating, further concentrated stick water, circulating in the second circulation circuit, a stream forming part of this further concentrated stick water possibly being led to a third circulation circuit comprising a third expansion vessel and a third heat exchanger, with similar function as said first and second circulation circuits, an amount of the so formed, many times concentrated stick water being discharged from the system or being possibly led to said dryer for drying.

Mechanical compressors of different kinds can be used for compressing the steam from the expansion vessel, for instance a centrifugal compressor.

It is suitable, considering the heat transfer in the said heat exchangers, to bring the compressed steam stream, discharged from the mechanical compressor, which steam is superheated, to a state of saturation by feeding a corresponding water stream.

In one suitable embodiment of the process according to the invention the stream of compressed steam is brought to yield heat in a heat exchanger in the form of a plate heat exchanger.

According to the new process, the energy consumption is reduced to about 35 kgs oil/ton raw material, if the same consists of fish, compared to about 50 kgs oil/ton raw material in a plant, utilizing a conventional process.

A great advantage with the new process is, that every apparatus unit is heated individually independently of other units, why the system in a simple way can be brought into heat balance. Further advantages are, that low temperature heat in drying gases and boiler are not needed for use internally in the system. The process temperature can be kept at 95° C. throughout, why bacteriae growth and the formation of easily volatile nitrogen compounds are completely depressed.

Figure 2:
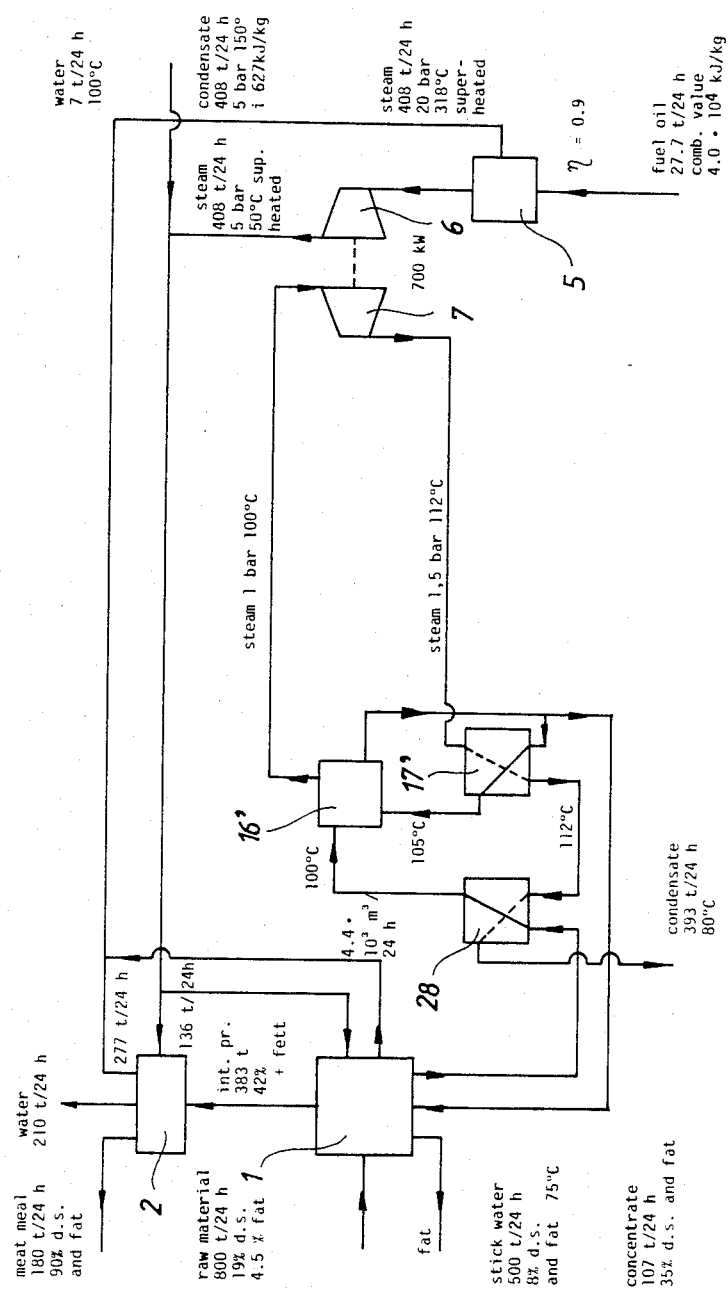

The process shall now be described more in detail, reference being made to the enclosed figures, of which FIG. 1 shows, schematically a plant for carrying out the process according to the invention, and FIG. 2 shows materials and heat balances for the treatment of 800 tons/24 h fish raw material.

In FIG. 1 1 is the unit of the plant, where the raw material is boiled and is separated, partly into a stream with relatively high concentration of solid substance, which stream is led to a dryer 2, partly into a fat stream, which is discharged from the plant through a line 3, and partly a stick water stream, which is led through a line 4 to evaporation, which shall be described infra. Unit 1 can be formed in many ways and shall not be described further, as it consists of techniques, well known to a person, skilled in the art. A steam generator for generating superheated steam is marked 5. It feeds a back pressure turbine 6, which drives a mechanical compressor 7. The back pressure steam from the turbine 6 is superheated and is led through lines 8, 9, 10 and 11 to the dryer 2 and unit 1. As the steam is superheated water is fed to saturation through a line 12. Condensate from the dryer 2 and unit 1 are recirculated to the steam generator 5 through lines 13, 14 and 15.

In the plant shown the evaporation is carried out in three steps, with the aid of these expansion vessels $16^1$, $16^2$ and $16^3$, coupled in series. Each of these forms, together with a corresponding heat exchanger $17^1$, $17^2$ and $17^3$ a circulation circuit, provided by lines $18^1$, $18^2$, $18^3$, $19^1$, $19^2$ and $19^3$. Said circulation circuits are coupled in series by the lines 20 and 21. Steam discharged from the expansion vessels $16^1$, $16^2$ and $16^3$ is led through lines $22^1$, $22^2$ and $22^3$ to a common line 23, and further through this to the compressor 7, where it is compressed and is led to the heat exchangers $17^1$, $17^2$ and $17^3$ through the lines 24, $25^1$, $25^2$ and $25^3$. The condensate from said steam is led via lines $26^1$, $26^2$, $26^3$ and 27 to a heat exchanger 28, where the condensate preheates the stick water stream, fed to the evaporator unit through the line 4. The cooled condensate from the heat exchanger 28 is discharged through a line 29. The heated stick water stream is led through a line 30 to the first expansion vessel $16^1$.

As the plant has now been described, it is intended to be driven with the three expansion vessels $16^1$, $16^2$ and $16^3$ coupled in series. Thereby the many times concentrated stick water, which is circulating in the third circulation circuit in the line $19^3$, partly returns through a line 31 to unit 1. The plant can, however, operate using one single expansion vessel $16^1$, in this case stick water, which has been concentrated in the first circulation circuit, partly returns through a line 32 and further through the line 31 to unit 1. The steam, that is discharged from the first expansion vessel $16^1$ is compressed in the compressor 7 and the compressed steam is fed to the heat exchanger $17^1$. The condensate is led, like in the first case, to the heat exchanger 28, where is heats the stick water stream, entering the first expansion vessel $16^1$. The raw material is fed through a line 33, burning oil through a line 34, whist dried meat meal is discharged through an outlet 35 and steam liberated in the dryer is discharged through a line 36.

In the described plant evaporation effect is fed solely by compression of the liberated steam, by a mechanical compressor driven by a back pressure turbine, the back pressure steam of which is utilized for boiling and drying. In this way a very good heat economy is achieved in the plant, which is also characterized by simple and reliable operation.

In FIG. 2 some material and anergy data are given for a plant, sized for 800 tons/24 h fish raw material, in which only one expansion vessel is used for evaporation of the stick water. The steam, that is liberated from the expansion vessel is compressed from 1 bar 100° C. to 1.5 bars 112° C. and transfers evaporation effect to the single circulation circuit, in which 44000 m$^3$/24 h are circulating. The back pressure turbine is driven by 20 bars steam, superheated 100° C., and leaves steam of 5 bars, superheated 50° C. to which is fed water to a saturation state, before it is utilized in the dryer and boiler unit. The steam generator is presumed to have an efficiency of 90% and the specific oil consumption is only 35 kgs oil/1000 kgs raw material which shall be compared to a corresponding consumption of the order 50 kgs oil/1000 kgs raw material in a conventional plant.

I claim:

1. In a process for continuous manufacture of meat meal and fat from an animal raw material by at least partly boiling a stream of said raw material in a boiler heated indirectly with steam, separating the boiled material into a stream of solid material, a stream of fat, and a stream of proteinuous stick water, at least partly drying said solid material in a dryer heated indirectly by steam, at least partly evaporating said stick water to a relatively concentrated state, and discharging the concentrated stick water and dried solid material from the process, the improvement which comprises generating a steam stream in a steam generator, causing the steam stream to drive a steam turbine under expansion to a relatively high back pressure, passing the steam stream at said back pressure to said boiler and said dryer to heat the same, driving a mechanical compressor from said turbine, at least partly effecting said evaporating of the stick water by causing said stick water stream to yield a stream of expansion steam through pressure reduction in an expansion vessel, passing said stream of expansion steam from said vessel to said compressor to compress the expansion steam, circulating a stream of concentrated stick water in a circulation circuit including said expansion vessel and a heat exchanger, flowing compressed steam from said compressor to said heat exchanger to yield heat to said stream of concentrated stick water, and discharging part of the concentrated stick water from said circulation circuit.

2. A process according to claim 1, comprising also bringing a compressed, superheated steam stream emerging from the mechanical compressor to a saturation state by feeding of a water stream.

3. The improvement of claim 1, comprising also recirculating to said steam generator a condensate resulting from condensing of said steam stream in said boiler and dryer.

4. The improvement of claim 1 or 3, comprising passing concentrated stick water discharged from said circuit to said dryer for drying.

5. The improvement of claim 1 or 3, comprising also leading a flow of concentrated stick water from said circulation circuit to a second circulation circuit including a second expansion vessel and a second heat exchanger, causing said stick water flow to yield a second stream of expansion steam through pressure reduction in said expansion vessel, passing said second stream of expansion steam to said compressor to compress the same, flowing compressed steam from said compressor to said second heat exchanger to yield heat to further concentrate stick water in said second circulation circuit, and discharging part of the further concentrated stick water from said second circuit.

6. The improvement of claim 5 comprising leading further concentrated stick water from said second circuit to said dryer for drying.

7. The improvement of claim 1, in which said heat exchanger is a plate heat exchanger.

* * * * *